(12) United States Patent
Gosnell et al.

(10) Patent No.: US 8,607,343 B2
(45) Date of Patent: Dec. 10, 2013

(54) TICKET-BASED PERSONALIZATION

(75) Inventors: Jason D. Gosnell, San Francisco, CA (US); Jerrold V. Hauck, Windermere, FL (US); Michael Brouwer, San Jose, CA (US); Tahoma Toelkes, San Jose, CA (US)

(73) Assignee: Apple Inc., Cupertino, CA (US)

( * ) Notice: Subject to any disclaimer, the term of this patent is extended or adjusted under 35 U.S.C. 154(b) by 84 days.

(21) Appl. No.: 13/246,802

(22) Filed: Sep. 27, 2011

(65) Prior Publication Data

US 2012/0311313 A1    Dec. 6, 2012

Related U.S. Application Data

(60) Provisional application No. 61/493,480, filed on Jun. 5, 2011.

(51) Int. Cl.
| | |
|---|---|
| *G06F 12/14* | (2006.01) |
| *G06F 7/04* | (2006.01) |
| *H04L 29/06* | (2006.01) |
| *H04L 9/32* | (2006.01) |
| *H04L 9/00* | (2006.01) |
| *H04L 9/28* | (2006.01) |

(52) U.S. Cl.
USPC .............. 726/22; 726/10; 726/26; 713/165; 713/168; 713/181; 713/187; 380/262; 380/28

(58) Field of Classification Search
USPC ........ 726/22, 10, 26; 713/165, 168, 181, 187; 380/262, 28
See application file for complete search history.

(56) References Cited

U.S. PATENT DOCUMENTS

| | | | |
|---|---|---|---|
| 8,443,204 B2 * | 5/2013 | Hauck et al. ................... | 713/187 |
| 2005/0071677 A1 * | 3/2005 | Khanna et al. ................ | 713/201 |
| 2006/0123117 A1 | 6/2006 | Heutchy et al. | |
| 2009/0019547 A1 | 1/2009 | Palliyil et al. | |
| 2009/0055902 A1 | 2/2009 | McGarvey et al. | |
| 2009/0070598 A1 * | 3/2009 | Cromer et al. ................ | 713/193 |
| 2009/0144547 A1 | 6/2009 | Roig | |
| 2009/0199002 A1 | 8/2009 | Erickson | |

* cited by examiner

*Primary Examiner* — Aravind Moorthy
(74) *Attorney, Agent, or Firm* — Blakely, Sokoloff, Taylor & Zafman LLP

(57) ABSTRACT

Securely installing and booting software of a device to run OS authorized according to a ticket that is validated by a nonce generated by application processor (AP) in booted OS stage prior to entering a restore mode is described. AP in booted OS stage generates a pre-flight nonce that is stored in a trusted location (effaceable storage). AP in booted OS stage performs one-way hash of pre-flight nonce and sends the hashed pre-flight nonce to ticket authorization server. AP enters restore mode. AP in first stage bootloader receives a ticket from the ticket authorization server including a signed copy of the hashed pre-flight nonce. AP in first stage bootloader validates the signed ticket by comparing one-way hash of the pre-flight nonce stored in the trusted location and the hashed nonce in the signed ticket. Pre-flight nonce expires after timeout period and upon reboot of AP. Other embodiments are also described.

18 Claims, 4 Drawing Sheets

TICKET-BASED PERSONALIZATION

CROSS-REFERENCE TO RELATED APPLICATIONS

This application claims the benefit pursuant to 35 U.S.C. 119(e) of U.S. Provisional Application No. 61/493,480, filed Jun. 5, 2011, which application is specifically incorporated herein, in its entirety, by reference.

FIELD

Embodiments of the invention relate generally to the field of installing and booting software of a device, and more particularly, to methods, apparatuses and systems for securely installing and booting software of a device to run an operating system authorized according to a ticket that is validated by a nonce generated by the application processor in a booted operating system stage prior to entering a restore mode.

BACKGROUND

A device's operating system may provide some security features to guard against attacks on the device. While developers update the device's operating system to rectify any security holes or exploits in the previous operating system that were uncovered by attackers, the attackers are able to sidestep the security features implemented in the new operating system and continue to take advantage of the security holes in the old operating system by rolling the device back to a previous operating system (e.g., replay). Further, when restoring a device to install a new operating system, the information transmitted to and from the device is vulnerable to copying by the attackers.

In addition, in order to update the device's operating system, the device enters a restore mode and is then required to interact with a server to obtain personalization data. In the event that the server is not functional at the time the device enters restore mode, the user is forced to entirely reboot the device.

Therefore, the current anti-replay schemes do not adequately prevent hackers from running unauthorized operating systems on a device and the method of restoring the device does not provide adequate customer satisfaction.

SUMMARY

Methods, apparatuses and systems for securely installing and booting software of a device to run an operating system authorized according to a ticket that is validated by a nonce generated by the application processor in a booted operating system stage prior to entering a restore mode are described herein.

In one embodiment of the invention, the application processor (AP) of a device in booted operating system (OS) stage generates a pre-flight nonce and stores the pre-flight nonce in a trusted location. Using the pre-flight nonce, the AP in the booted OS may communicate with the server to obtain uniquely encrypted ("personalized") software (i.e., a new OS) prior to entering the restore mode. Thus, having the personalized new OS at the booted OS stage, the device is ensured to complete the restoring of the device to the new OS once the device enters the restore mode. In one embodiment, the AP in the booted OS stage may then hash the pre-flight nonce and send the hashed pre-flight nonce to a server. When the device enters a restore mode, the AP in a first stage bootloader may receive a signed ticket from the server. The signed ticket includes a signed copy of the hashed pre-flight nonce. The AP in a first stage bootloader may then cryptographically validate the ticket by hashing the pre-flight nonce that may be stored in the trusted location and comparing the result of hashing the nonce stored in the trusted location with the signed copy of the hashed pre-flight nonce included in the signed ticket. If the hashed nonces match, the AP in the first stage bootloader may trust the nonce such that the ticket is validated and the AP may install the personalized new OS according to the signed ticket.

In another embodiment, the AP in the first stage bootloader may determine if a nonce is stored in the trusted location. If no nonce is stored in the trusted location, the first stage bootloader may generate a bootloader-generated nonce.

In another embodiment, the trusted location is an effaceable storage. An effaceable storage is a storage that may be completely erased. By placing the nonce in an effaceable storage, once the nonce is erased, the effaceable storage cannot be snooped at a low level to obtain a history of previous trusted nonces. Using the effaceable storage prevents attackers from using previously trusted nonces to replay a personalization with that nonce and further, running an exploited OS.

In yet another embodiment, the nonce may expire in order to further prevent reusing the nonce to replay any previous personalization. In some embodiments, the nonce is removed from the trusted location after a predetermined amount of time such as, for example, an hour. Once the nonce is removed from the trusted location, the nonce is expired and no longer trusted by the AP in the first stage bootloader. In other embodiments, the nonce expires upon reboot of the AP.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations may have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one. In the drawings.

DETAILED DESCRIPTION

In the following description, numerous specific details are set forth. However, it is understood that embodiments of the invention may be practiced without these specific details. In other instances, well-known circuits, structures, and techniques have not been shown to avoid obscuring the understanding of this description.

In some embodiments, a digital signature per device (unique to each device) is required to be created at installation time by a remote server. Thus, if an exploit is found in a particular version of the software or, more specifically, the operating system, the server can refuse to allow any device to install that version. In other words, the server may be configured to no longer sign a particular version of the operating system which has been exploited such that that exploited version of the operating system is not available for installation on devices. This is referred to as revocation.

However, attackers have been able to roll the device back to that version of the operating system to take advantage of the security holes therein by caching and reusing the signed data vended by the server. Thus, the attackers were able to reinstall the exploited version of the operating system irrespective of the server policy. Such "roll-back" attacks are typically countered by employing a nonce value issued by the device to the server as a challenge of "liveness". However, if attackers have access to the previously used nonce values and can force the device to trust the previously used nonces, the nonce-based counter measure can be defeated. The attackers may have been able to acquire the previously used nonces by (i) snooping the storage of the device at a low level to find a history of previously used nonces, and (ii) by listening to traffic between the device and the server during installation of boot components on the device. Boot components may be software components for booting a device.

According to certain embodiments of the invention, there are potentially three primary security protections provided: (i) prevent attackers from obtaining the previous nonces via snooping the storage of the device at a low level, (ii) prevent attackers from using the previous nonces, and (iii) prevent attackers from obtaining the current or previous nonces via the traffic between the device and the server.

The following description is divided into two parts. Part I gives a brief overview of networked systems in which an embodiment of the invention may be implemented. Part II describes methods of authorizing the installing of boot components for securely booting a device according to authorized tickets.

Part I. Overview of Networked Systems and Network System Components

Figure 1:
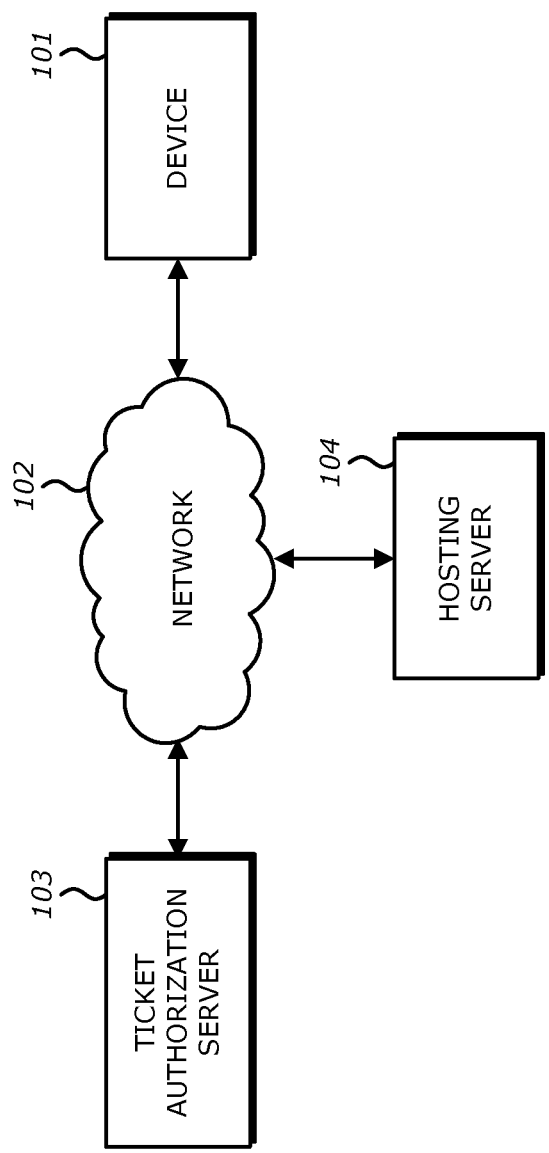
FIG. 1 shows a block diagram illustrating one embodiment of networked systems to authorize installing boot components for securely booting a device according to authorized tickets.

FIG. 1 shows a block diagram illustrating one embodiment of a networked system 100 to authorize installing boot components for securely booting a device 101 according to authorized tickets. For example, the device 101 may represent a Smart Phone such as an iPhone™ from Apple Inc. of Cupertino, Calif. The term "host" and the term "device," used herein, are intended to refer generally to data processing systems rather than specifically to a particular form factor for the host versus a form factor for the device.

As illustrated in FIG. 1, networked system 100 may include one or more servers coupled to a device 101 via trusted and/or un-trusted networks 102 to provide boot components authorized by a ticket for booting the device 101. The network may be physically located in a secure location to be trusted or may be trusted according to secure connections based on cryptographic protocols, e.g., SSL (Secure Socket Layer), PVN (Private Virtual Networking), or other connections. In one embodiment, network system 100 include a hosting server 104 that downloads boot components via the network 102 and a ticket authorization server 103 that personalizes the device 101 for booting.

Typically, the device 101 can boot into an operating state according to a group of one or more personalized components stored inside the device 101. In one embodiment, a personalized component for a device may be based on a raw boot component encrypted uniquely, i.e. personalized, for the device. The group of personalized components may be based on a combination of raw boot components downloaded from the hosting server 104 specifically for the device 101, for example, according to a signed ticket. In one embodiment, the device 101 receives a ticket from the ticket authorization server 103 over the network 102 to personalize the device 101 for booting. The ticket authorization server 103 may determine the group of personalized components for the device 101 to generate a ticket. The ticket authorization server 103 may cryptographically sign the ticket to produce the signed ticket that is sent to the device 101.

A ticket may provide a collection of expected hashes and version identifiers for each component in the secure boot and recovery processes. The collection is personalized to a given unit via a device unit identifier. The full collection, including personalization may be protected with a single signature. Once delivered to the device and validated, the ticket may serve as the central authority on the expected and allowed component versions that define a particular release (i.e., version of operating system or other software) for the device. By validating subsequent boot time measurements of each stage against the corresponding values in the central ticket, the device may abdicate authority for the mixing and matching of components to the server.

Figure 2:
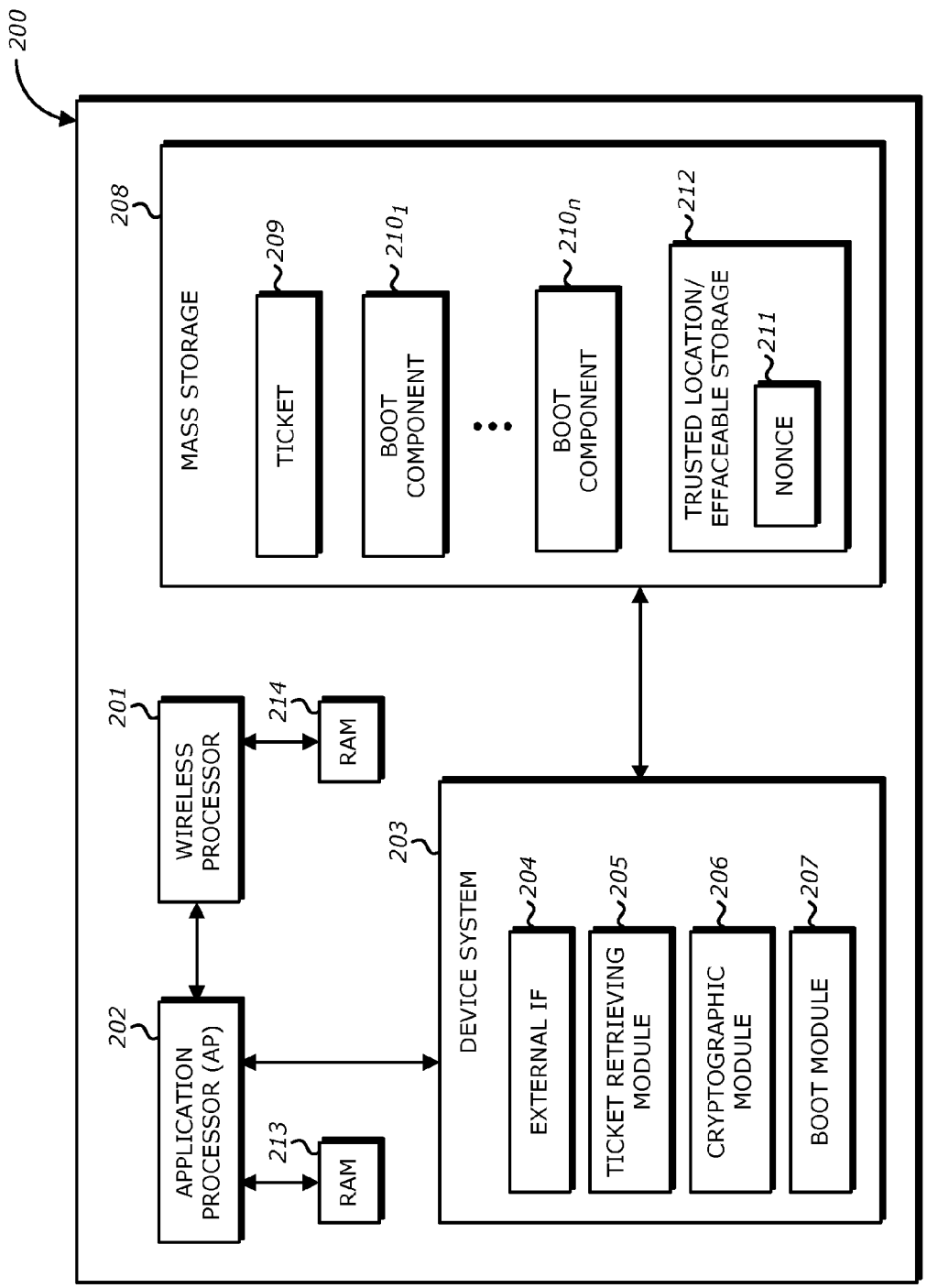
FIG. 2 shows a block diagram illustrating one embodiment of system components to verify a ticket and install boot components for booting a device.

FIG. 2 shows a block diagram illustrating one embodiment of system 200 components to verify a ticket and install boot components for booting the device 101. System 200 may be hosted in a device such as device 101 of FIG. 1. In one embodiment, system 200 includes a device system 203 stored in a memory, e.g. a RAM and/or ROM, coupled to a mass storage 208, e.g. flash or hard disk. Device system 203 may be coupled with a remote server, such as a ticket authorization server 103 of FIG. 1, over a network via an external interface 204. In one embodiment, the device system 203 may be locally coupled to a host device, for example, using an USB (Universal Serial Bus) connection via the external interface 204.

In one embodiment, the mass storage 208 may store a local ticket 209 and one or more boot components $210_1$-$210_n$ (n>1) for booting the device system 203. The local ticket 209 may be associated with a current operating environment of the device system 203. The boot components $210_1$-$210_n$ (n>1) may be raw boot components (not yet validated and/or personalized) downloaded from, for example, the hosting server 104 in FIG. 1.

In one embodiment, the device system 203 includes a ticket retrieving module 205, a cryptographic module 206, and a boot module 207. The cryptographic module 206 may include implementations of cryptographic operations based on, e.g. SHA (Secure Hashing Algorithm) hashing functions such as SHA-1, SHA-224, SHA-256, SHA-384, and SHA-512, data encrypting algorithms such as AES (Advanced Encryption Standard) encryption, and/or public key cryptography such as RSA (Ralph Shamir Adelman) public key cryptography. A ticket retrieving module 205 may send a ticket request to an authorization server, such as ticket authorization server 103 of FIG. 1, to authorize a ticket for booting the device system 203. In one embodiment, the ticket retrieving module 205 sends a ticket request in response to an external command received via the external interface 204. The ticket retrieving module 205 may generate a random number, such as a nonce 211, on the fly for a ticket request. The nonce 211 may also be stored in a trusted location 212 in the mass storage 208. In some embodiments, the trusted location is an effaceable storage 212 included in the mass storage 208. The effaceable storage 212 is a storage that may be completely erased.

In one embodiment, the cryptographic module 206 may perform a one-way hash, such as SHA-1, of the nonce 211, and the ticket retrieving module 205 may include the hashed nonce 211 in the ticket request being sent to the ticket authorization server 103. The ticket authorization server 103 may then send a signed ticket to the device system 203. In some embodiments, the signed ticket includes a signed copy of the hashed nonce 211.

In response to receiving the signed ticket, the ticket retrieving module 205 may communicate with the cryptographic module 206 to verify whether the signed ticket is authentic. In some embodiments, the cryptographic module 206 may retrieve the nonce 211 from the trusted location in the mass storage 208 and perform a one-way hash, such as SHA-1, of the nonce 211 that is retrieved from the trusted location. The cryptographic module 206 may then compare the hash of the nonce 211 that is retrieved to the signed copy of the hashed nonce 211 included in the signed ticket. If the hashed nonces match, signed ticket is validated and the ticket retrieving module 205 may store the validated signed ticket in the mass storage 208 as the local ticket 209. Subsequent image validations may be performed against this validated signed ticket stored in the mass storage 208. In some embodiments, if the hashed nonces do not match, the signed ticket is not validated and is discarded.

According to one embodiment, the boot module 207 performs one or more boot operations including loading a boot component such as one of the boot components $210_1$-$210_n$ (n>1) from the mass storage 208. Alternatively, the boot module 207 may receive a boot component externally from the external interface 204. The boot module 207 may communicate with the cryptographic module 206 to validate the personalized boot component according to the signed ticket.

As illustrated in FIG. 2, the device 101 may also include a wireless communications processor 201 and an application processor 202 communicatively coupled to each other via internal bus. Wireless processor 201 may be any kind of wireless processor, such as for example, cellular processor, a Wi-Fi processor, a Bluetooth processor, etc. Application processor 202 may be any kind of general-purpose processor. The device 101 may include random access memory (RAM) 214 associated with the wireless processor 201 and a RAM 213 associated with the application processor 202. RAM 214 is utilized by wireless processor 201 to execute any software components associated with the wireless processor 201, including boot code, an operating system (OS), and other runtime applications and/or data, etc. Similarly, RAM 213 is utilized by application processor 102 to execute any software components associated with the application processor 202, including boot code, an OS, a file system as well as other applications and/or data.

Figure 3:
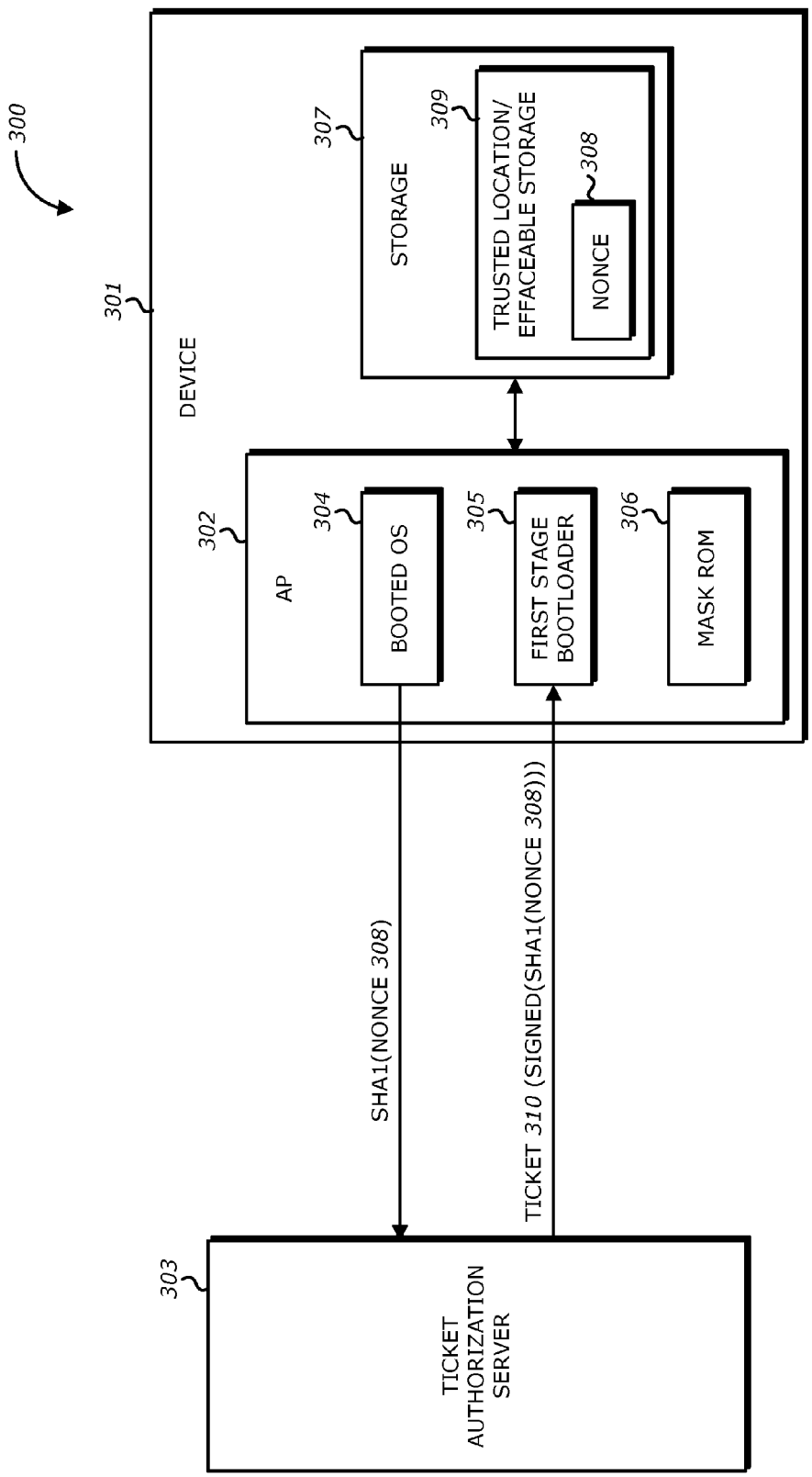
FIG. 3 shows a sequence diagram of one embodiment of method for authorizing the installation of boot components for securely booting a device according to authorized tickets.

FIG. 3 shows a block diagram of one embodiment of a system 300 for authorizing the installation of boot components for securely booting a device according to authorized tickets. In one embodiment, the application processor 302 included in device 301 passes through different stages as the device 301 is booted in the restore mode. The different stages include the mask ROM (Read-Only Memory) 306, the first stage bootloader 305, potentially a second stage bootloader (not illustrated) and the booted operating system (OS) 304.

As illustrated in FIG. 3, in one embodiment, the application processor (AP) 302, in the booted OS stage, generates a nonce 308 using, for example, the ticket retrieving module 205 of FIG. 2. This nonce may be called a pre-flight nonce. The AP 302 may store the pre-flight nonce 308 in a trusted location 309 in the mass storage 307 included in the device 301. In some embodiments, the trusted location 309 may be an effaceable storage 309 in the mass storage 307. In one embodiment, the AP 302 may also perform a one-way hash of the pre-flight nonce 308 using, for example, the cryptographic module 206 in FIG. 2, and send the hashed pre-flight nonce 308 (e.g., SHA1 (nonce 308)) to the server 303, which may be, for example, the ticket authorization server 103 from FIG. 1. In some embodiments, the hashed pre-flight nonce 308 is included in a ticket request sent from the ticket retrieving module 205 to the ticket authorization server 103.

Once the device 301 enters the restore mode, the AP 302 in the first stage bootloader 305 receives a signed ticket 310 from the server 303. The signed ticket 310 may include a signed copy of the hashed pre-flight nonce 308. In order to validate the signed ticket 310, the AP 302 in the first stage bootloader 305 retrieves the pre-flight nonce 308 from the trusted location 309 which is a location known by the AP 302 in the first stage bootloader 305. The AP 302 in the first stage bootloader 305 may then perform a one-way hash of the pre-flight nonce 308 that was retrieved from the trusted location 309 and compares the hash of the pre-flight nonce 308 that was retrieved from trusted location 309 with the signed copy of the hashed pre-flight nonce 308 that was included in the signed ticket 310. If the hashes match, signed ticket is validated and the AP 302 in the first stage bootloader 305 may trust the signed ticket 310 and the pre-flight nonce 308. Accordingly, in some embodiments, if the signed ticket 310 is validated, AP 302 in the first stage bootloader 305 validates the personalized new OS according to the signed ticket 310. In one embodiment, if the hashes do not match, the signed ticket is not validated and is discarded.

Part II. Methods of Authorizing the Installation of Boot Components for Securely Booting a Device According to Authorized Tickets.

The following embodiments of the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, etc. The processes are performed by processing logic that comprises hardware (e.g., circuitry, dedicated logic, etc.), software (such as is run on a general-purpose computer system or dedicated machine), or a combination of both.

According to some embodiments of the invention, when the AP in the booted OS state initiates a restore, all the firmware that is required for the restore is personalized in a single transaction prior to entering the restore mode. This operation, called "pre-flight," and also requires that the pre-flight nonce be verified by the first stage bootloader. Thus, the AP in the booted OS stage communicates with the server in order to obtain the personalized software (i.e., new OS) prior to entering into the restore mode. By having the personalized new OS at the booted OS stage, the device is ensured to complete the restore process and update to the new OS prior to entering the restore mode.

Figure 4:
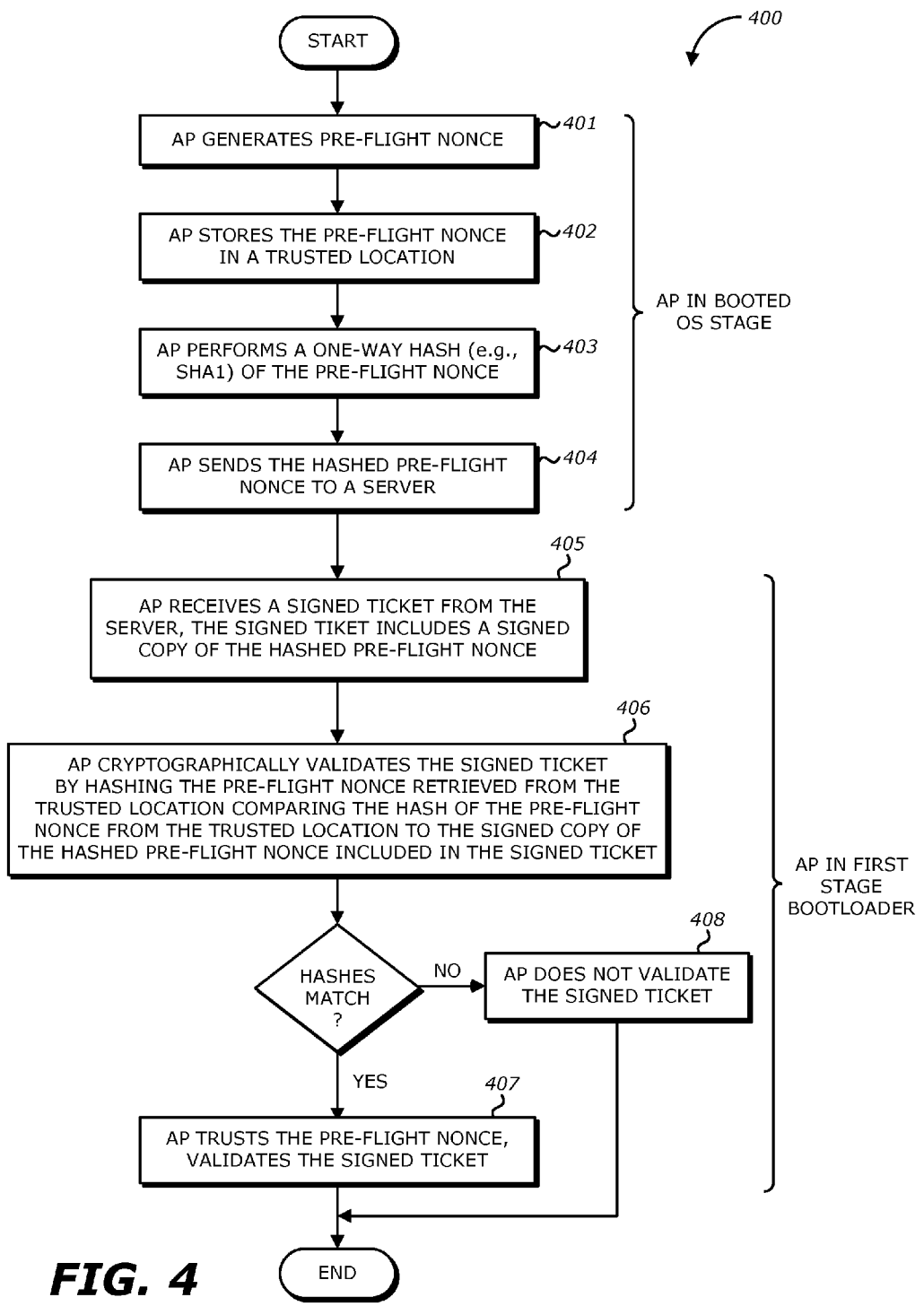
FIG. 4 shows a flow diagram of one embodiment of a method for authorizing the installation of boot components for securely booting a device according to authorized tickets.

FIG. 4 shows a flow diagram of one embodiment of a method 400 for authorizing the installation of boot components for securely booting a device according to authorized tickets. For example, method 400 may be performed by the device system 203 of FIG. 2.

Method 400 begins with the AP generating a nonce in the booted OS stage (Block 401). This nonce may be called a pre-flight nonce. At Block 402, the AP in the booted OS stage may store the pre-flight nonce in a trusted location in the mass storage included in the device. In some embodiments, the trusted location may be an effaceable storage included in the mass storage. The effaceable storage is a storage that may be completely erased. Therefore, according to these embodiments, storing a pre-flight nonce in the effaceable storage prevents attackers from obtaining a history of previously used pre-flight nonces via snooping the storage of the device at a low level. In other words, once the nonce is erased from the effaceable storage, the nonce is completely erased and cannot be obtained via snooping of the effaceable storage at a low level.

At Block 403, the AP in the booted OS stage may then perform a one-way hash, such as SHA-1, on the pre-flight nonce. At Block 404, the hashed pre-flight nonce may be included in a ticket request and sent to the ticket authorization server. In some embodiments, the AP enters into restore mode and the AP in the first stage bootloader, receives a signed ticket from the ticket authorization server at Block 405. The signed ticket includes a signed copy of the hashed pre-flight nonce. Accordingly, in some embodiments, attackers are prevented from obtaining the pre-flight nonce via listening to the traffic between the device and the ticket authorization server because the traffic includes a one-way hash of the pre-flight nonce. In other words, the attackers may only obtain the one-way hash of the pre-flight nonce and not, the pre-flight nonce itself.

In Block 406, in one embodiment, the AP in the first stage bootloader validates the received signed ticket by performing a one-way hash, such as SHA-1, on the pre-flight nonce that is retrieved from the trusted location and compares the hashed pre-fight nonce retrieved from the trusted location to the hashed pre-flight nonce included in the signed ticket. In some embodiments, the trusted location is known by subsequent boot stages, such as the first stage bootloader, and the pre-flight nonce stored in the trusted location may be used by the subsequent bootstages. Thus, the AP in the first stage bootloader may retrieve the pre-flight nonce from the trusted location. At Block 407, if the hashes match, the AP in the first stage bootloader trusts the pre-flight nonce and thus, the signed ticket is validated. Thus, in some embodiments, the AP in the first stage bootloader validates the personalized new OS according to the validated signed ticket. In some embodiments, if the hashes do not match, the AP in the first stage bootloader does not trust that the signed ticket was generated in a live transaction with the ticket authorization server and does not validate the signed ticket.

According to some embodiments, by making the pre-flight nonce available to the bootloader via the trusted location, this minimizes the opportunity for attackers to gain access to and modify the pre-flight nonce in such a way that the bootloader would trust the modified pre-flight nonce and exploited versions of the OS may be replayed using the modified pre-flight nonce. In some embodiments, the AP in the first stage bootloader does not find a pre-flight nonce stored in the trusted location, the AP in the first stage bootloader generates a bootloader-generated nonce.

In some embodiments, the pre-flight nonce that is stored in the trusted location expires after a predetermined amount of time or upon reboot of the device. In one embodiment, the predetermined amount of time may be one hour. In some embodiments, when a pre-flight nonce expires, the pre-flight nonce is removed from the trusted location. In the event that attackers obtain a nonce, the expiry of that nonce ensures that the attackers cannot use that nonce to pre-personalize a ticket without following through with a restore, but rather, to restore the device at a later time by replaying the ticket. In other words, if the nonce does not expire within a short window of time, attackers may replay an exploited version of the OS on the device at a later time using the nonce.

In the description, certain terminology is used to describe features of the invention. For example, in certain situations, the terms "component," "unit," "module," and "logic" are representative of hardware and/or software configured to perform one or more functions. For instance, examples of "hardware" include, but are not limited or restricted to an integrated circuit such as a processor (e.g., a digital signal processor, microprocessor, application specific integrated circuit, a micro-controller, etc.). Of course, the hardware may be alternatively implemented as a finite state machine or even combinatorial logic. An example of "software" includes executable code in the form of an application, an applet, a routine or even a series of instructions. The software may be stored in any type of machine-readable medium.

An embodiment of the invention may be a machine-readable medium having stored thereon instructions which program a processor to perform some or all of the operations described above. A machine-readable medium may include any mechanism for storing or transmitting information in a form readable by a machine (e.g., a computer), such as Compact Disc Read-Only Memory (CD-ROMs), Read-Only Memory (ROMs), Random Access Memory (RAM), and Erasable Programmable Read-Only Memory (EPROM). In other embodiments, some of these operations might be performed by specific hardware components that contain hardwired logic. Those operations might alternatively be performed by any combination of programmable computer components and fixed hardware circuit components.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

What is claimed is:

1. A method of personalizing an operating system (OS) for a device, the method comprising:

retrieving operating components personalized for the device when the device has been booted with the OS, wherein the device includes a storage unit having a trusted location;

generating a nonce into the trusted location via the booted OS of the device;

generating a first hash of the nonce via the booted OS of the device;

sending a request including the first hash to a server for a ticket to validate the operating components;

receiving the ticket from the server in response to the request when the device is being booted to a personalized OS, the ticket including a signed hash;

generating a second hash of the nonce from the trusted location when the device is being booted to the personalized OS;

determining if the ticket is trusted based on a comparison of the second hash and the signed hash of the ticket; and validating, if the ticket is trusted, the operating components via the ticket to install the operating components as the device is being booted to the personalized OS.

2. The method of claim 1 further comprising:
determine if the nonce is stored in the trusted location when the device is booting to the personalized OS, and
if the nonce is not stored in the trusted location, generating a bootloader-generated nonce.

3. The method of claim 1, wherein the trusted location is an effaceable storage.

4. The method of claim 1, wherein the nonce is removed from the trusted location after a predetermined amount of time.

5. The method of claim 4, wherein the predetermined amount of time is an hour.

6. The method of claim 1, wherein the nonce is removed from the trusted location upon reboot of the device.

7. A system for a personalized operating system (OS), the system comprising:
a memory storing executable instructions including an operating system;
a storage including a trusted location; and
an application processor (AP) coupled to the storage and the memory to execute the executable instructions, the application processor being configured to
retrieve operating components personalized for the system when the system has been booted with the OS,
generate a nonce into the trusted location via the booted OS,
generate a first hash of the nonce via the booted OS,
send a request including the first hash to a server for a ticket to validate the operating components,
receive the ticket from the server in response to the request when the system is being booted to a personalized OS, the ticket including a signed hash, wherein the system is booted to the personalized OS via a plurality of stages including a first stage bootloader,
generate a second hash of the nonce from the trusted location when the system is being booted in the first stage bootloader,
determine if the ticket is trusted based on a comparison of the second hash and the signed hash of the ticket, and
validate, if the ticket is trusted, the operating components via the ticket to install the operating components as the device is being booted to the personalized OS via the stages.

8. The system of claim 7, wherein
in the first stage bootloader, if the nonce is determined not to be stored in the trusted location, a bootloader-generated nonce is generated.

9. The system of claim 7, wherein the trusted location is an effaceable storage.

10. The system of claim 7, wherein the nonce is removed from the trusted location after a predetermined amount of time.

11. The system of claim 10, wherein the predetermined amount of time is an hour.

12. The system of claim 7, wherein the nonce is removed from the trusted location upon reboot of the AP.

13. A machine-readable non-transitory storage medium having instructions therein, which when executed by a machine, cause the machine to perform a method comprising:
retrieving operating components personalized for a device when the device has been booted with an OS, wherein the device includes a storage unit having a trusted location;
generating a nonce into the trusted location via the booted OS of the device;
generating a first hash of the nonce via the booted OS of the device;
sending a request including the first hash to a server for a ticket to validate the operating components;
receiving the ticket from the server in response to the request when the device is being booted to a personalized OS, the ticket including a signed hash;
generating a second hash of the nonce from the trusted location when the device is being booted to the personalized OS;
determining if the ticket is trusted based on a comparison of the second hash and the signed hash of the ticket; and
validating, if the ticket is trusted, the operating components via the ticket to install the operating components as the device is being booted to the personalized OS.

14. The medium of claim 13, wherein the method further comprises:
determining if the nonce is stored in the trusted location when the device is booting to the personalized OS, and
generating a bootloader-generated nonce if the nonce is not stored in the trusted location.

15. The medium of claim 13, wherein the trusted location is an effaceable storage.

16. The medium of claim 13, wherein the nonce is removed from the trusted location after a predetermined amount of time.

17. The medium of claim 16, wherein the predetermined amount of time is an hour.

18. The medium of claim 13, wherein the nonce is removed from the trusted location upon reboot of the device.

* * * * *